(12) United States Patent
Nikaido et al.

(10) Patent No.: US 6,889,001 B1
(45) Date of Patent: May 3, 2005

(54) DISK PLAYER WITH LOCATION MARKING CAPABILITY

(75) Inventors: Hidenori Nikaido, Sukagawa (JP); Koji Akita, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 0 days.

(21) Appl. No.: 09/557,862

(22) Filed: Apr. 26, 2000

(30) Foreign Application Priority Data

Apr. 27, 1999 (JP) .......................................... 11-120787
Apr. 28, 1999 (JP) .......................................... 11-121140

(51) Int. Cl.[7] ............................................. H04N 5/781
(52) U.S. Cl. .......................... 386/125; 386/65; 386/69; 386/83
(58) Field of Search ............................ 386/46, 55, 52, 386/65, 83, 121, 124, 69, 125

(56) References Cited

U.S. PATENT DOCUMENTS

| | | | | |
|---|---|---|---|---|
| 5,107,343 A | * | 4/1992 | Kawai | ......................... 386/106 |
| 5,740,304 A | * | 4/1998 | Katsuyama et al. | .......... 386/46 |
| 5,929,857 A | | 7/1999 | Dinallo et al. | |
| 6,295,094 B1 | * | 9/2001 | Cuccia | ......................... 386/112 |
| 6,501,902 B1 | * | 12/2002 | Wang | ........................... 386/52 |
| 6,532,334 B1 | * | 3/2003 | Kikuchi et al. | ................ 386/68 |

* cited by examiner

Primary Examiner—Andrew Faile
Assistant Examiner—James A. Fletcher
(74) Attorney, Agent, or Firm—Brinks Hofer Gilson Lione

(57) ABSTRACT

A disk player includes a system controller. The system controller creates marked-playback-start-position specifying data every time a user presses a playback position marking key of an operation unit to mark a playback start position. If the user presses a menu screen display key of the operation unit to instruct the display of a marked-playback-start-position selection-menu screen, the system controller displays an image corresponding to each playback start position on the marked start position menu screen. If title playback is stopped or paused, the system controller creates stop position specifying data for specifying a stop position and stores the data in a RAM. The system controller displays a stop position menu screen including stop-position-related information based on the stop position specifying data. If any of the stop-position-related information is selected, the system controller restarts the playback of images and sound from the corresponding stop position based on the stop position specifying data.

10 Claims, 12 Drawing Sheets

| MARKED-PLAYBACK-START-POSITION SELECTION-MENU SCREEN | | |
|---|---|---|
| IMAGE CORRESPONDING TO MARKED PLAYBACK START POSITION A | IMAGE CORRESPONDING TO MARKED PLAYBACK START POSITION B | IMAGE CORRESPONDING TO MARKED PLAYBACK START POSITION C |
| IMAGE CORRESPONDING TO MARKED PLAYBACK START POSITION D | IMAGE CORRESPONDING TO MARKED PLAYBACK START POSITION E | IMAGE CORRESPONDING TO MARKED PLAYBACK START POSITION F |
| IMAGE CORRESPONDING TO MARKED PLAYBACK START POSITION G | IMAGE CORRESPONDING TO MARKED PLAYBACK START POSITION H | IMAGE CORRESPONDING TO MARKED PLAYBACK START POSITION I |

FIG. 7

| DVD_ID CORRESPONDING TO DVD INSERTED INTO DVD PLAYER |
|---|
| VTS NUMBER OF VTS CORRESPONDING TO TITLE BEING PLAYED |
| PLAYBACK TIME WHEN PLAYBACK START POSITION IS MARKED |

FIG. 9

| MARKED-PLAYBACK-START-POSITION SELECTION-MENU SCREEN | | |
|---|---|---|
| IMAGE CORRESPONDING TO MARKED PLAYBACK START POSITION A | IMAGE CORRESPONDING TO MARKED PLAYBACK START POSITION B | IMAGE CORRESPONDING TO MARKED PLAYBACK START POSITION C |
| IMAGE CORRESPONDING TO MARKED PLAYBACK START POSITION D | IMAGE CORRESPONDING TO MARKED PLAYBACK START POSITION E | IMAGE CORRESPONDING TO MARKED PLAYBACK START POSITION F |
| IMAGE CORRESPONDING TO MARKED PLAYBACK START POSITION G | IMAGE CORRESPONDING TO MARKED PLAYBACK START POSITION H | IMAGE CORRESPONDING TO MARKED PLAYBACK START POSITION I |

FIG. 10

| MARKED-PLAYBACK-START-POSITION SELECTION-MENU SCREEN | | |
|---|---|---|
| IMAGE CORRESPONDING TO MARKED PLAYBACK START POSITION A | IMAGE CORRESPONDING TO MARKED PLAYBACK START POSITION B | IMAGE CORRESPONDING TO MARKED PLAYBACK START POSITION C |
| IMAGE CORRESPONDING TO MARKED PLAYBACK START POSITION D | IMAGE CORRESPONDING TO MARKED PLAYBACK START POSITION E | IMAGE CORRESPONDING TO MARKED PLAYBACK START POSITION F |
| IMAGE CORRESPONDING TO MARKED PLAYBACK START POSITION G | IMAGE CORRESPONDING TO MARKED PLAYBACK START POSITION H | IMAGE CORRESPONDING TO MARKED PLAYBACK START POSITION I |

FIG. 11

| |
|---|
| CREATION DATE OF DATA |
| DISK NAME OF DVD INSERTED INTO DVD PLAYER |
| VTS NUMBER OF VTS CORRESPONDING TO TITLE BEING PLAYED WHEN STOPPED |
| PTT NUMBER CORRESPONDING TO CHAPTER BEING PLAYED WHEN STOPPED |
| STOP POSITION TIME |

FIG. 14

| STOP POSITION MENU SCREEN | | | | |
|---|---|---|---|---|
| (RECORD DATE) | (DISK NAME) | (TITLE NO.) | (CHAPTER NO.) | (COMMENT) |
| 990125 | ○○○○○○○○ | 2 | 3 | ××× |
| 990115 | ××× | 3 | 3 | ××× |
| 990115 | ××× | 3 | 5 | △△△ |
| 990105 | △△△△△△△ | 2 | 2 | ○○○ |
| 990105 | ○○○○○○○○ | 1 | 7 | ○○○ |
| 990105 | □□□□□□ | 3 | 4 | △△△ |
| ⋮ | | | | |

DISK PLAYER WITH LOCATION MARKING CAPABILITY

BACKGROUND OF THE INVENTION

1. Field of the Invention

The present invention relates to disk players for playing digital versatile disks (DVDs) and the like.

2. Description of the Related Art

Recently, DVDs for use as disk information-storage media have attracted greater attention. The DVDs have a diameter of 12 cm and a thickness of 1.2 mm. Although the DVDs have the same form as compact to disks (CDs), the single and double-sided DVDs achieve storage capacities of 4.7 gigabytes and 9.4 gigabytes, respectively, by increasing the storage density.

The DVDs store various types of data by employing an image data compression technique and an audio data compression technique based on MPEG-2. One type of stored data is control data for performing each function. For example, when a movie is stored in a DVD, it is normal to store video data and audio data in the DVD. In addition, the DVD may store a plurality of subtitle data, so that subtitles of the language selected by a user can be displayed. The DVD may also store static image data, such as profiles of a director of the movie and profiles of actors/actresses who played in the movie. The contents of these static image data are displayed according to an operation performed by the user. In addition, the DVD can store a playback start position marked (specified) by the user during playback. A DVD player can thus start to play the DVD from the marked playback start position (hereinafter referred to as a "marking function"). The DVD player plays the DVD by reading data required for performing the functions from the DVD.

The DVD player performs the marking function by storing the playback start position marked by the user during playback and associating the playback start position and a number (playback start position number). Subsequently, the DVD player plays the DVD from the playback start position associated with the playback start position number selected by the user.

It is also possible to restart the DVD from a stop position after the DVD is paused (hereinafter referred to as a "pre-stop function"). The DVD player reads various data from the DVD and performs various operations to execute the functions.

The user is required to memorize the correspondence between the marked playback start position and the playback start position number so as to enable the conventional DVD player to execute the marking function. If the user forgets the correspondence, he/she fails to properly select a desired playback start position. When numerous playback start positions are marked, the user has difficulty in memorizing the correspondence between each playback start position and each playback start position number. In this case, the user selects one of the playback start position numbers as he/she thinks appropriate, and determines whether the DVD should be played from the desired playback start position after viewing images played by the DVD player. If the determination is negative, the user selects another playback start position number. Thus, the user often fails to properly select the desired playback start position. Even if a single playback start position is marked, after a few days since the marking of the playback start position, the user often fails to remember the contents of images to be played by the DVD player when the playback start position is selected. It is inconvenient for the user to use the marking function, and the conventional marking function is disadvantageous in that the user has difficulty in memorizing the contents of data to be read in correspondence with a stored playback location.

The pre-stop function is executed by holding an optical pickup for detecting data stored in the DVD in place where the playing of the DVD is stopped. In response to an instruction to restart playing, the optical pickup is immediately restarted to play the DVD from the stop position.

When the playing is completely stopped and the power is turned off, the optical pickup returns to the original position (for example, the position from which data written to the innermost circle of the DVD is read). In this case, the user is required to give various instructions, such as playing, fast-forwarding, and rewinding, in order to find the appropriate stop position. The operation becomes burdensome, and thus the DVD player has difficulty in playing the DVD from the right stop position.

SUMMARY OF THE INVENTION

Accordingly, it is an object of the present invention to provide a disk player for enabling a user to easily understand the contents of data to be read in correspondence with a stored playback location.

It is another object of the present invention to provide a disk player for easily playing a disk from a stop position.

To this end, according to one aspect of the present invention, there is provided a disk player for marking playback locations when images and/or sound stored in a disk storage medium are being played and for subsequently playing the images and/or the sound from the marked playback locations as playback start positions. The disk player includes a specification data creation/storage unit for creating and storing playback location specifying data for specifying the playback locations marked during playback; a selection menu display unit for displaying a selection menu including choices associated with playback images corresponding to the playback locations based on the playback location specifying data stored by the specification data creation/storage unit; and a data playing unit for playing, when any of the choices included in the selection menu is selected, the images and/or the sound from the associated playback location as the playback start position. Since the images associated with the playback locations are displayed when a user selects one from the playback locations, he/she can confirm the contents by looking at the images, thus positively and easily understanding the contents of the playback locations.

Each of the playback location specifying data may include information for identifying the disk storage medium to be played. In this manner, the correspondence between the particular disk storage medium and each playback location is easily obtained even when the disk storage medium is replaced. Hence, the user can easily understand the contents of the playback locations stored in each disk storage medium.

When displaying the selection menu, the selection menu display unit may create the playback images associated with the choices by reading data stored in the disk storage medium. A large capacity is required for generating and storing an image associated with each choice in the selection menu every time the selection menu is displayed. However, the capacity of data to be stored can be reduced by reading data required for generating the image from the disk storage medium every time the menu screen is displayed. The cost is thus reduced due to the reduced memory capacity.

According to another aspect of the present invention, there is provided a disk player including a specification data creation/storage unit for creating and storing, when playback of images and/or sound stored in a disk storage medium is stopped, at least one stop position specifying data including at least identification information about the disk storage medium currently inserted in the disk player and at least one stop playback location; a selection menu display unit for displaying, based on the stop position specifying data stored by the specification data creation/storage unit, a selection menu including information for specifying the disk storage medium and the stop playback location; and a data playing unit for playing, when the stop playback location included in the selection menu is selected and when the corresponding disk storage unit is inserted, the images and/or the sound from the stop playback location on the disk storage medium. The user can thus designate a disk storage medium to be played from the stored stop position and a desired stop position while looking at the selection menu. Accordingly, playback of a particular disk storage medium from a particular stop position is simplified.

When displaying the selection menu, the selection menu display unit may partially highlight a display region corresponding to the disk storage medium currently inserted in the disk player. This simplifies confirmation of the actually inserted disk storage medium in case there are a plurality of disk storage media for which stop position specifying data are created. Therefore, a selection item corresponding to an un-inserted disk storage medium is prevented from being selected by mistake.

The disk player may further include a comment input unit for inputting, when the selection menu is displayed, a comment corresponding to the stop position specifying data. If a plurality of stop position specifying data corresponding to the same disk storage medium is created, it is difficult to distinguish among the stop position specifying data. This disadvantage can be minimized by adding a corresponding comment to each of the stop position specifying data. The user can thus positively start playback continuously from a particular stop position on a desired disk storage medium.

BRIEF DESCRIPTION OF THE DRAWINGS

FIG. 7 is an illustration of an example of marked-playback-start-position specifying data according to the first embodiment of the present invention;

FIG. 9 is an illustration of an example of the marked-playback-start-position selection-menu screen;

FIG. 10 is an illustration of a state in which one image is selected in the marked playback start position selection menu;

FIG. 11 is an illustration of an example of stop position specifying data;

FIG. 14 is an illustration of an example of the display of the stop position menu screen.

DESCRIPTION OF THE PREFERRED EMBODIMENTS

A DVD player according to a first embodiment of the present invention is described hereinafter with reference to the accompanying drawings.

Figure 1:
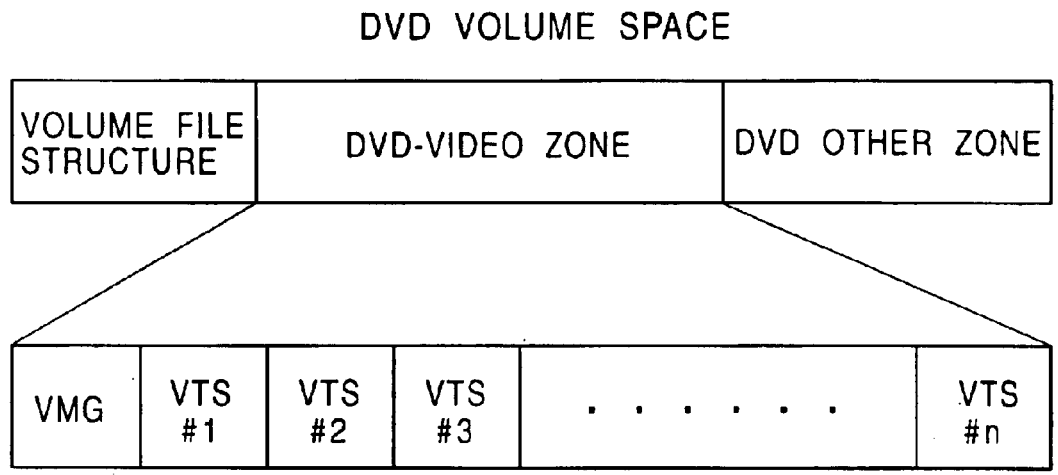
FIG. 1 is a block diagram of the structure of a DVD volume space according to first and second embodiments of the present invention.

Data stored in a DVD as a disk storage medium are described in detail below. FIG. 1 shows the structure of a DVD volume space. As shown in FIG. 1, the DVD volume space includes, from the innermost to the outermost, a volume file structure, a DVD-video zone, and a DVD other zone. The DVD-video zone includes various types of data required for playing the DVD. The DVD-video zone includes a video manager (VMG) and one or more video title sets (VTSs) corresponding to each title.

Figure 2:
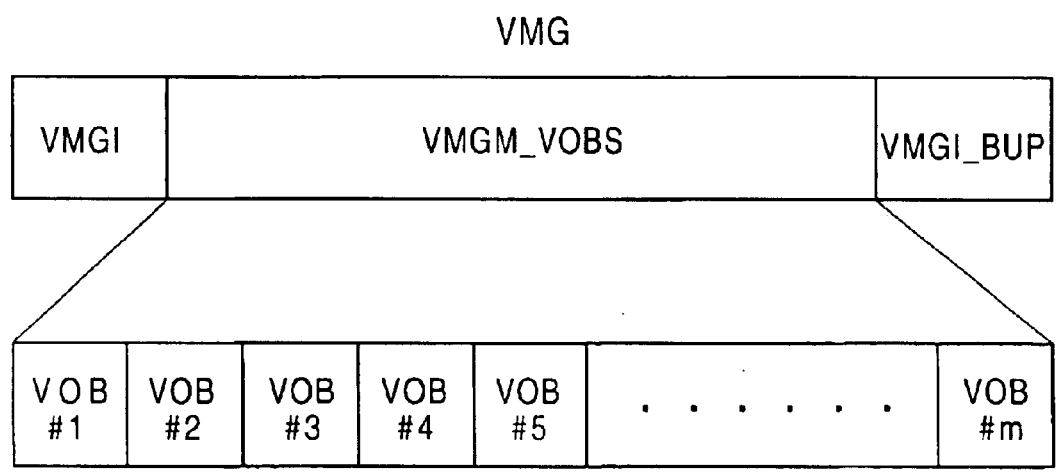
FIG. 2 is a block diagram of the data structure of a video manager (VMG) according to the first and second embodiments of the present invention.

FIG. 2 shows the data structure of the VMG. As shown in FIG. 2, the VMG includes video manager information (VMGI), a VMG menu video object set (VMGM_VOBS), and a VMGI back up file (VMGI_BUP).

The VMGI includes information (such as the number of VTSs, a VTS number for discriminating each VTS, and the storage position of each VTS in the DVD) about the VTSs, a display order of titles displayed on a title menu, one or more pieces of program chain information (PGCI), a disk ID (DVD_ID) for identifying the DVD, and a disk name (for example, the title of a movie). The VMGM_VOBS includes one or more video objects (VOBs). The VOBs include video data, which are playback data for playing back a menu screen (title menu screen) which enables a user to select a title.

Figure 3:
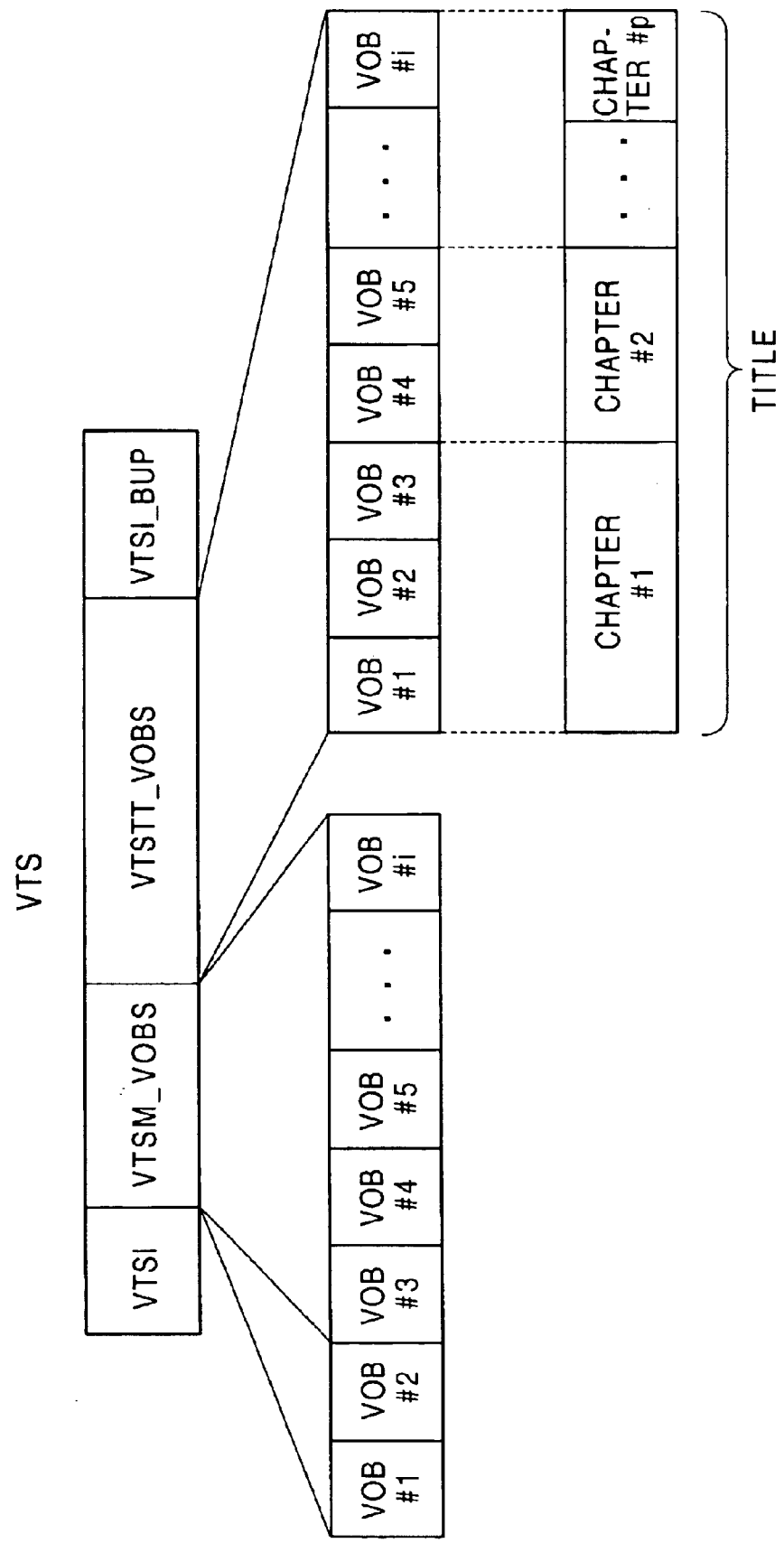
FIG. 3 is a block diagram of the data structure of a video title set (VTS) according to the first and second embodiments of the present invention.

FIG. 3 shows the data structure of each of the VTSs. As shown in FIG. 3, the VTS includes video title set information (VTSI), a VTS menu video object set (VTSM_VOBS), a VTS title video object set (VTSTT_VOBS), and a VTSI back up file (VTSI_BUP).

The VTSI includes information about a title, a PTT number for discriminating each chapter in the VTS, the number of chapters in the VTS, and one or more pieces of PGCI. The VTSM_VOBS and the VTSTT_VOBS include one or more VOBs. The VOBs include playback data, such as video data and audio data.

The playback data of the "title" is included in VOBs #1 to #i in the VTSTT_VOBS. A chapter is a unit obtained by dividing the title. The playback data of chapters are included in one or more VOBs in the VTSTT_VOBS. With continued reference to FIG. 3, the title is divided into chapters #1 to #p by way of example. The playback data of the chapter #1 is included in the VOBs #1 to #3. The playback data of the chapter #2 is included in the VOBs #4 and #5.

Figure 4:
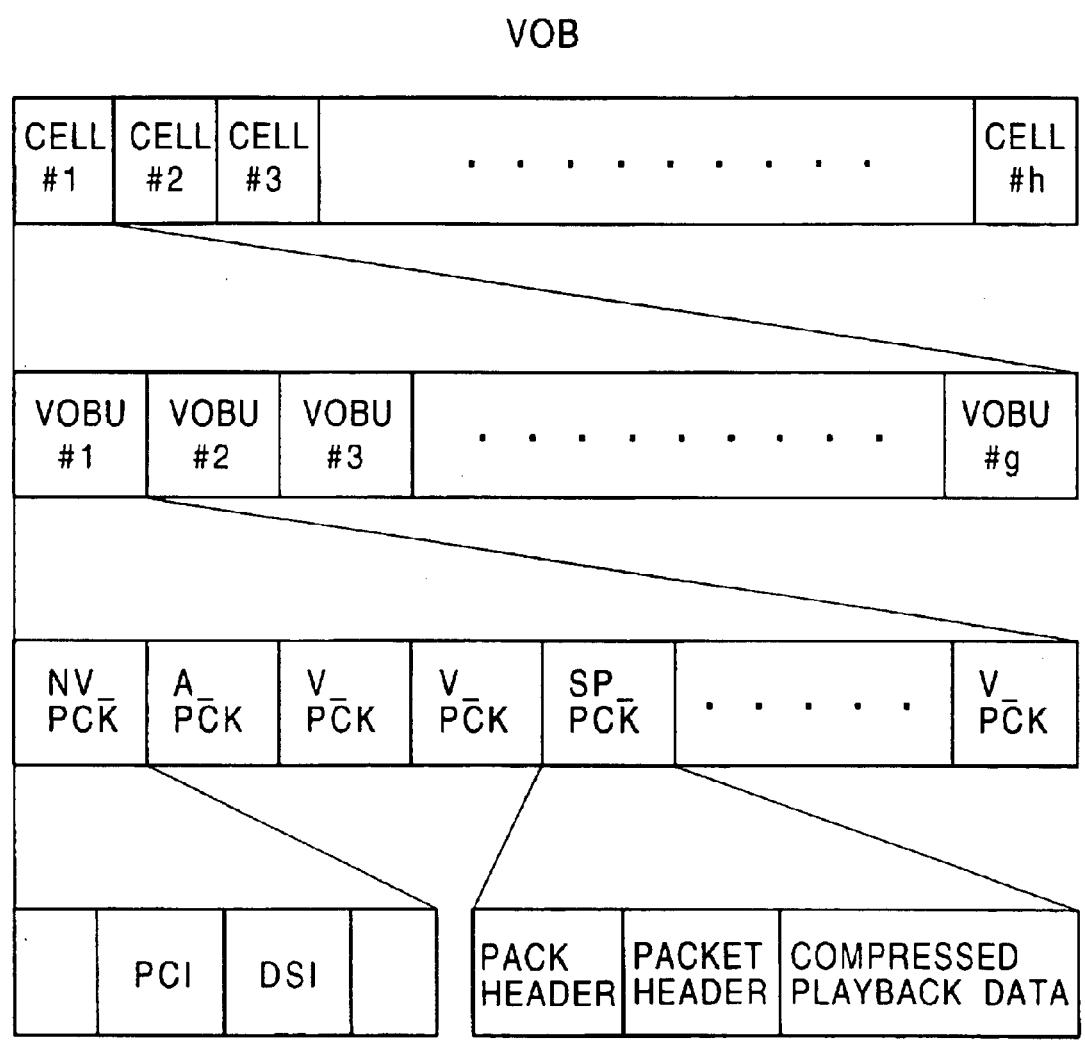
FIG. 4 is a block diagram of the data structure of a video object (VOB) according to the first and second embodiments of the present invention.

FIG. 4 shows the data structure of each of the VOBs included in the VMGM_VOBS, the VTSM_VOBS, and the VTSTT_VOBS. As shown in FIG. 4, the VOB includes a plurality of cells. Each cell includes a plurality of video object units (VOBU). Each VOBU includes a navigation pack (NV_PCK) and at least one of a video pack (V_PCK), a subpicture pack (SP_PCK), and an audio pack (A_PCK).

The NV_PCK includes play control information (PCI) and data search information (DSI). In the PCI and the DSI, the amount of data in the VOBU, the playback time from the start of playing the title to the start of playing the corresponding VOBU, and the position of a VOBU to be played next are stored.

Each of the V_PCK, the SP_PCK, and the A_PCK includes a pack header including information about types (animation, subpictures, and audio) of playback data, a packet header, compressed video data, subpicture data, and audio data (compressed playback data).

When an image data compression technique based on MPEG-2 is employed, a group of pictures (GOP) is formed of all video packs included in a single VOBU. The GOP includes image data corresponding to a playback time of about 0.5 seconds. Specifically, the GOP includes image data corresponding to at least one I-picture (intra-coded picture), image data corresponding to a plurality of P-pictures (predictive-coded pictures) which are periodically inserted, and image data corresponding to a plurality of B-pictures (bidirectionally predictive-coded pictures) inserted between the I-picture and the P-picture or between two P-pictures.

A program chain (PGC), which is a logical playback unit in playback, includes program chain information (PGCI) and cells included in one or more VOBs. For example, the PGC includes one PGCI in the VMGI and the cells included in the VOBs in the VMGM_VOBS. Alternatively, the PGC includes one PGCI in the VTSI and the cells included in the VOBs in the VTSTT_VOBS.

The PGC which is formed of the PGCI in the VMGI and the cells included in the VOBs in the VMGM_VOBS displays the title menu. When a certain item is selected in the title menu, the PGC specifies the playback location of data corresponding to the selected item. The PGC which is formed of the PGCI in the VTSI and the cells included in the VOBs in the VTSTT_VOBS includes various types of data required for playing back the corresponding contents when a certain item is selected in the title menu.

Figure 5:
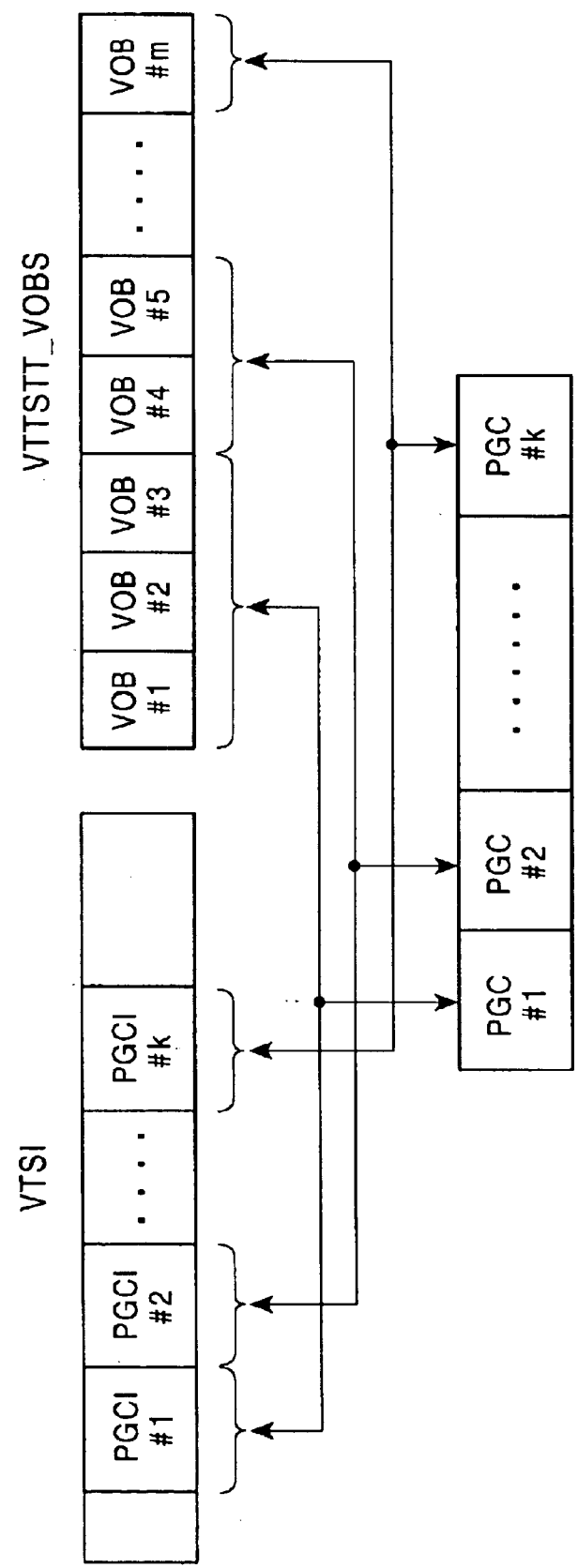
FIG. 5 is an example of the structure of a program chain (PGC) according to the first and second embodiments of the present invention.

FIG. 5 shows an example of structures of the PGCs. Each structure includes the PGCI in the VTSI and the cells included in the VOBs in the VTSTT_VOBS. As shown in FIG. 5, for example, a PGC #1 includes PGCI #1 in the VRSI and cells included in VOBs #1 to #3 in the VTSTT_VOBS. A PGC #2 includes PGCI #2 in the VTSI and cells included in the VOBs #4 and #5 in the VTSTT_VOBS. These PGCs are specified by PGC numbers. The PGC numbers are determined in accordance with a storage order of the PGCI in the VTSI. For example, the PGCI shown in FIG. 5 are stored in the VTSI in the order of the PGCI #1 to the PGCI #2. Thus, the PGC number of the PGC #1 including the PGCI #1 is "1", and the PGC number of the PGC #2 including the PGCI #2 is "2".

The PGC formed of the PGCI in the VMGI and the cells in the VOBs in the VMGM_VOBS and the PGC formed of the PGCI in the VTSI and the cells in the VOBs in the VTSM_VOBS have the same structure as the PGC shown in FIG. 5. The PGCI includes a read order of corresponding VOBs and information about the PGC to be read next.

Navigation commands, executed during playback, include a button command (BTN_CMD) executed in accordance with an operation instruction given by the user; a pre-command (PRE_CMD) executed prior to the start of reading the PGC; a cell command (C_CMD) executed every time the reading of one cell in the PGC is completed; and a post-command (POST_CMD) executed subsequent to the completion of reading the PGC. Among these commands, the BTN_CMD is included in the PCI, whereas the PRE_CMD, the C_CMD, and the POST_CMD are included in the PGCI.

When the navigation commands are executed, navigation parameters are used as variables. The navigation parameters include system parameters (SPRM) and general parameters (GPRM), which occupy respective storage regions in a DVD player. The SPRM and the GPRM are set or updated in accordance with execution of the navigation commands, and are used as the variables when the navigation commands are executed thereafter.

Figure 6:
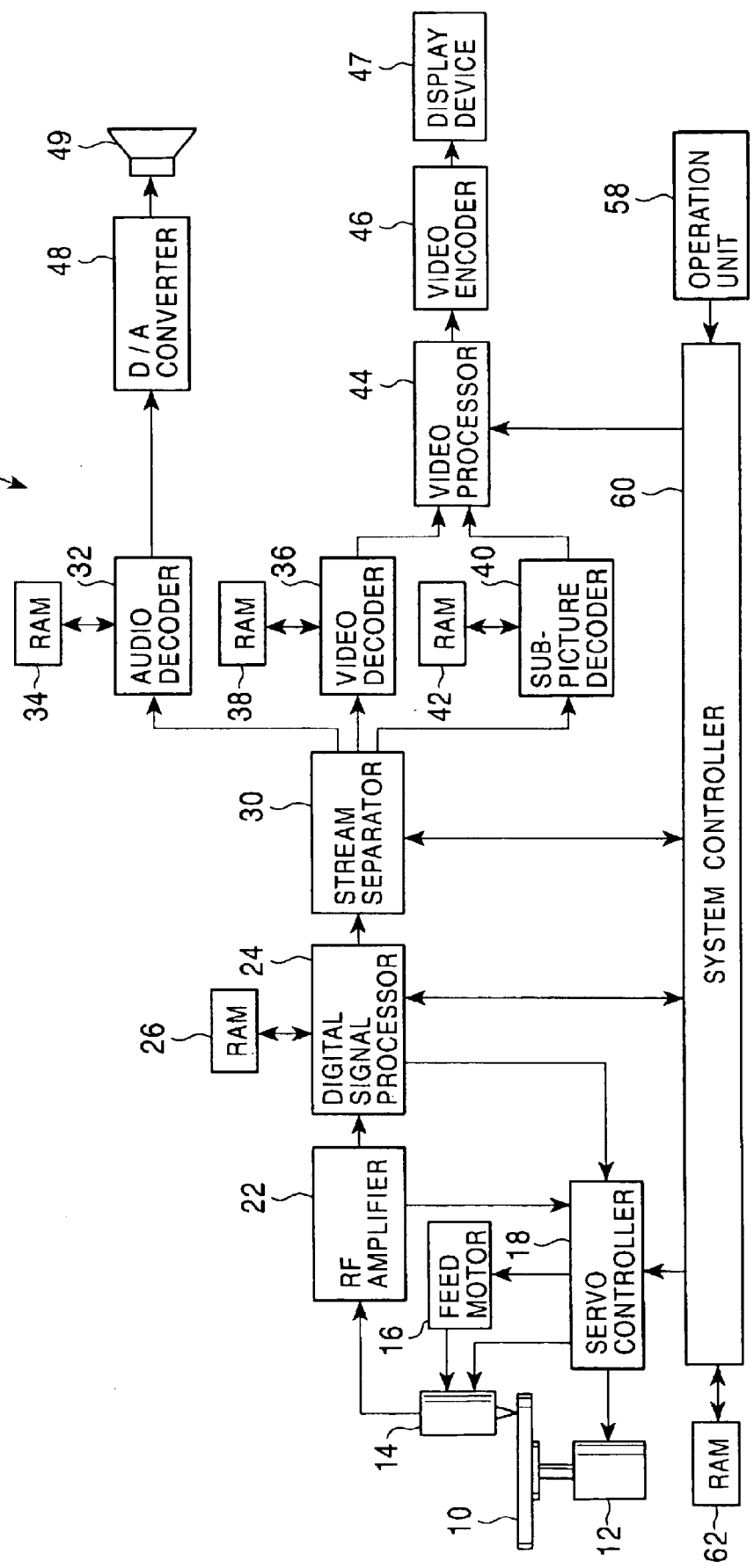
FIG. 6 is a block diagram of an overall DVD player according to the first and second embodiments of the present invention.

FIG. 6 shows an overall structure of a DVD player according to an embodiment of the present invention. Referring to FIG. 6, a DVD player 100 includes a spindle motor 12, an optical pickup 14 for reading a signal stored in a DVD 10, a feed motor 16, a servo controller 18, an RF amplifier 22 for amplifying the read signal so as to display an image and output sound, a digital signal processor 24, four buffer RAMs 26, 34, 38, and 42, a stream separator 30, an audio decoder 32, a video decoder 36, a subpicture decoder 40, a video processor 44, a video encoder 46, a display device 47, a digital-to-analog (D/A) converter 48, a speaker 49, an operation unit 58 for inputting various operation instructions by the user, a system controller 60 for controlling the overall DVD player 100, and a RAM 62.

The spindle motor 12 rotates the DVD 10 at a constant linear velocity. The optical pickup 14 detects data stored in the DVD 10. The optical pickup 14 includes, for example, a built-in semiconductor laser and a photo diode. The feed motor 16 moves the optical pickup 14 in the radial direction of the DVD 10.

The servo controller 18 drives the spindle motor 12 and the feed motor 16 in accordance with instructions from the system controller 60. The servo controller 18 also moves a built-in objective lens (not shown) included in the optical pickup 14 to move the focal position of the semiconductor laser in the vertical and horizontal directions with respect to a recording surface of the DVD 10. Also, the servo controller 18 performs various servo control (focus servo, tracking servo, and rotation servo) required for reading data from the DVD 10.

The RF amplifier 22 amplifies an electrical signal output from the built-in photo diode included in the optical pickup 14. When a track jump occurs due to a violent shake or impact applied to the DVD player 100, the RF amplifier 22 outputs a track jump detection signal.

In response to a signal output from the RF amplifier 22, the digital signal processor 24 converts the signal into digital data, performs signal demodulation (8–16 demodulation) in accordance with a data format of the DVD 10, performs error correction, and stores the data in the RAM 26. The digital signal processor 24 extracts the VMGI and the VTSI from the data stored in the RAM 26 in accordance with an instruction from the system controller 60 and outputs the extracted VMGI and VTSI to the system controller 60. In addition, the digital signal processor 24 extracts the VOBU and outputs the extracted VOBU to the stream separator 30.

In accordance with an instruction from the system controller 60, the stream separator 30 analyzes the pack headers forming the VOBU output from the digital signal processor 24 and separates the audio pack (A_PCK), the video pack (V_PCK), the subpicture pack (SB_PCK), and the navigation pack (NV_PCK). The audio pack separated by the stream separator 30 is output to the audio decoder 32, whereas the video pack is output to the video decoder 36. The subpicture pack is output to the subpicture decoder 40, and the navigation pack is forwarded to the system controller 60. When the user presses a playback start position marking key of the operation unit 58 (described hereinafter) and a playback start position is thus specified (marked) while the title is being played, the stream separator 30 forwards to the system controller 60 all video packs included in the VOBU being read at that time in accordance with an instruction from the system controller 60.

The audio decoder 32 performs predetermined decoding of the audio pack output from the stream separator 30 and outputs the audio data. The video decoder 36 performs predetermined decoding of the video packs output from the stream separator 30 and outputs the video data. When the image data compression technique based on MPEG-2 is employed, the video decoder 36 creates and outputs three types of video data, i.e., I-pictures, P-pictures, and B-pictures. This is performed based on the image data included in the video packs output from the stream separator 30, which correspond to the I-pictures, the P-pictures, and the B-pictures. The subpicture decoder 40 performs predetermined decoding of the subpicture pack output from the stream separator 30 and outputs the subpicture data.

The video processor 44 creates composite image data of the video data output from the video decoder 36 and the subpicture data output from the subpicture decoder 40 in accordance with an instruction from the system controller 60, and outputs the composite image data to the video encoder 46. The video encoder 46 converts the image data output from the video processor 44 into display picture signals. These picture signals are output to the display device 47, thus displaying an image.

The D/A converter 48 converts the audio data output from the audio decoder 32 into analog audio signals. These audio signals are output to the speaker 49, thus playing audio sound.

The operation unit 58 includes various operation keys such as a play key for giving an instruction to play the title; the playback start position marking key for marking a desired playback start position by means of the marking function; a menu screen display key for displaying a marked-playback-start-position selection-menu screen; right, left, up, and down cursor keys; and a setting key for confirming an item at the cursor position on the display screen. Signals in accordance with key operations are output to the system controller 60.

The system controller 60 performs control of all functional blocks, such as outputting various servo commands to the servo controller 18 and outputting an image formation instruction in accordance with the operation instruction given by the user to the video processor 44. Specifically, the system controller 60 receives the VMGI and the VTSI included in the data output from the digital signal processor 24 and the NV_PCK output from the stream separator 30 and executes the navigation commands included in these data. Thus, the system controller 60 performs various control operations required for playing the DVD, such as outputting various servo commands to the servo controller 18 and outputting the image formation instruction to the video processor 44. The system controller 60 uses the RAM 62 as a storage region for storing the navigation parameters (SPRM and GPRM), and sets or updates the SPRM and the GPRM in accordance with the navigation command execution, thus using the SPRM and the GPRM as variables when executing the navigation commands thereafter.

When the user presses the playback start position marking key of the operation unit 58 while the title is being played and thus the playback location at that time is marked as a playback start position, the system controller 60 creates marked-playback-start-position specifying data required for specifying the marked playback start position.

FIG. 7 shows an example of the marked-playback-start-position specifying data. Referring to FIG. 7, the marked-playback-start-position specifying data includes a DVD_ID corresponding to the DVD 10 inserted into the DVD player 100, a VTS number of the VTS corresponding to the title being played, and a playback time (playback time when the playback start position is marked) from the start of playing the title to the marked playback start position. For the DVD_ID, the DVD_ID included in the VMGI is set. For the VTS number of the VTS corresponding to the title being played, the corresponding one is selected from the VTS numbers included in the VMGI. For the playback time when the playback start position is marked, the sum of a playback time from the start of playing the title to the start of reading the corresponding VOBU and a time from the start of reading the VOBU to the marking of the playback start position is set.

The system controller 60 creates the marked-playback-start-position specifying data and stores the data in the RAM 62 every time the user presses the playback start position marking key of the operation unit 58 and the playback start position is marked.

When the user presses the menu screen display key of the operation unit 68 and thus the display of the marked-playback-start-position selection-menu screen is instructed, the system controller 60 performs a control operation to display the marked-playback-start-position selection-menu screen.

Specifically, the system controller 60 reads the marked-playback-start-position specifying data from the RAM 62. Based on the marked-playback-start-position specifying data, the system controller 60 specifies the VOBU being read when the playback start position is marked, and outputs the servo command for reading the video packs included in the specified VOBU from the DVD 10 to the servo controller 18. The video packs, which are read from the DVD 10 by means of the servo controller 18 and are included in the VOBU being read when the playback start position is marked, are sent to the video decoder 36 through the digital signal processor 24, the stream separator 30, and so forth.

The video decoder 36 performs predetermined decoding of the input video packs and outputs video data of images (static images) corresponding to the marked playback start position. For example, when the image data compression technique based on MPEG-2 is employed, the video decoder 36 forms one GOP for each marked playback start position in accordance with the input video packs. For the single GOP, the video decoder 36 generates three types of video data, i.e., I-pictures, P-pictures, and B-pictures based on the image data, included in the GOP, which correspond to the I-pictures, the P-pictures, and the B-pictures. The video decoder 36 selects one type of video data corresponding to the time when the playback start position is marked from the plurality of video data, and outputs the selected video data. A similar operation is performed for other GOPs, and one type of video data is output to the video processor 44 for each marked playback start position.

The system controller 60 outputs an instruction to create the marked-playback-start-position selection-menu screen to the video processor 44. In response to the instruction, the video processor 44 generates image data for displaying images corresponding to the marked playback start positions on one screen based on the input video data. The image data is converted by the video encoder 46 into display picture signals, and the signals are output to the display device 47. Accordingly, the marked-playback-start-position selection-menu screen including the images corresponding to the marked playback start positions is displayed.

When the user operates the cursor keys of the operation unit 58 to position the cursor on one of the images (images corresponding to the playback start positions) displayed on the marked-playback-start-position selection-menu screen, and the user confirms the selected playback start position by pressing the setting key, the system controller 60 performs control operations so as to start playing from the selected playback start position. The control operations include outputting various servo commands to the servo controller 18 and outputting the image formation instruction to the video processor 44.

Figure 8:
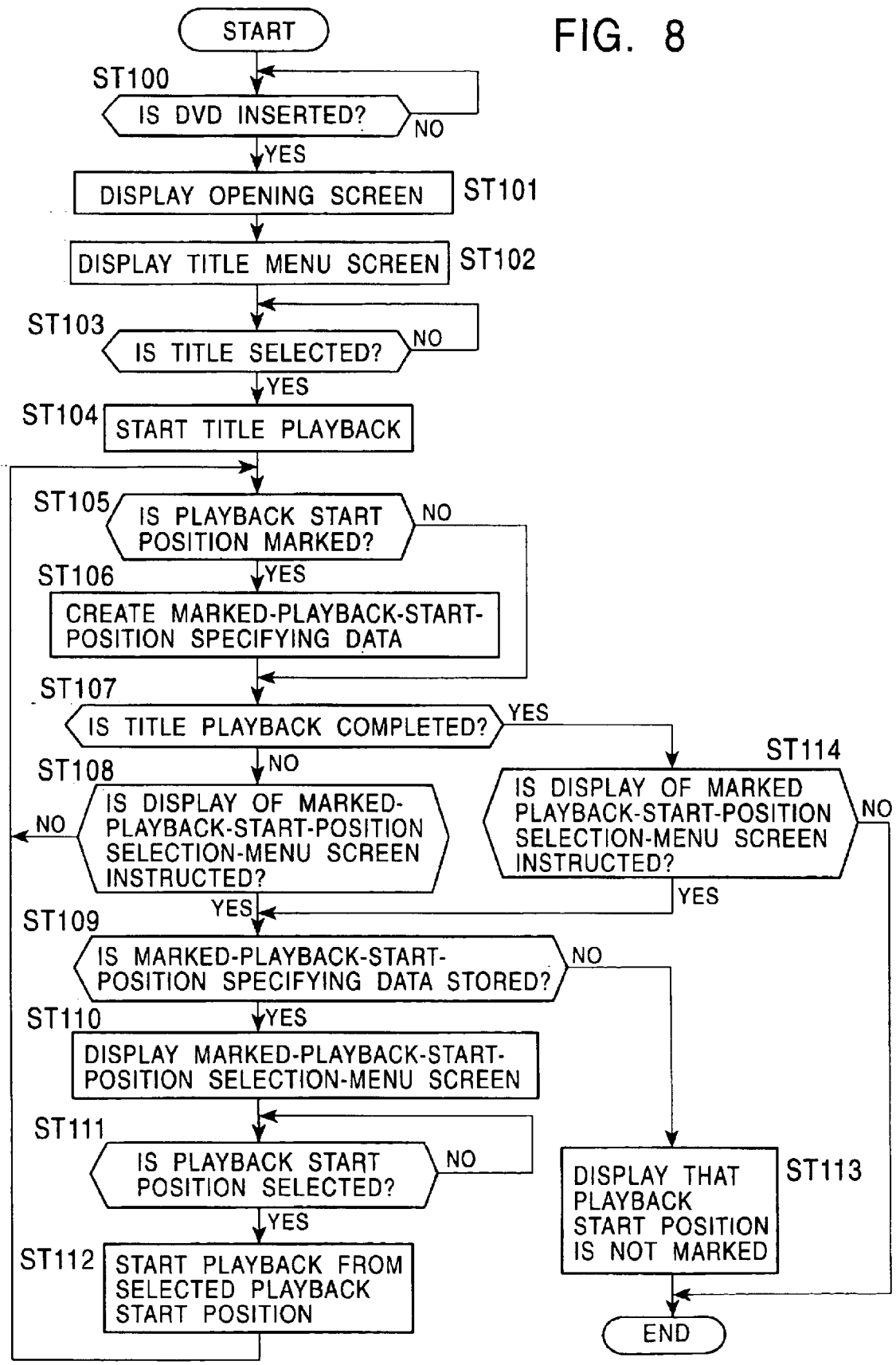
FIG. 8 is a flowchart describing a process of displaying a marked-playback-start-position selection-menu screen using the DVD player.

The operation of the DVD player 100 is described below. FIG. 8 is a flowchart describing a process of displaying the marked playback start position selection menu by the DVD player 100. In step ST100, the system controller 60 determines whether the DVD 10 is inserted into the DVD player 100 by the user. If the DVD 10 is inserted into the DVD player 100, the system controller 60 displays an opening screen for a predetermined period of time (step ST101), and displays a title menu screen (step ST102). For example, the system controller 60 reads the VOB corresponding to the opening screen based on the PGCI included in the VMG, and displays the predetermined opening screen. The system controller 60 then specifies the playback start position of the title menu displayed after the opening screen and displays the title menu.

In step ST103, the system controller 60 determines whether a title is selected. If the user operates the cursor keys of the operation unit 58 to position the cursor on a title displayed on the title menu, and confirms the selected title by pressing the setting key, the system controller 60 starts to play the title (step ST104).

When the title playback is started, the system controller 60 determines whether the playback start position marking key of the operation unit 58 is pressed by the user and thus the playback start position is marked (step ST105). If the playback start position is marked, the system controller 60 creates the marked-playback-start-position specifying data corresponding to the marked playback start position and stores the data in the RAM 62 (step ST106), and determines whether the title playback is completed (step ST107). If the playback start position is not marked, the system controller 60 does not create the marked-playback-start-position specifying data, and determines whether the title playback is completed (step ST107).

If the title playback is not completed, the system controller 60 determines whether the user has pressed the menu screen display key of the operation unit 58 and thus display of the marked-playback-start-position selection-menu screen is instructed (step ST108).

If the display of the marked-playback-start-position selection-menu screen is instructed, the system controller 60 determines whether the marked-playback-start-position specifying data corresponding to the title being played is stored in the RAM 62 (step ST109). Specifically, when the VTS number of the VTS corresponding to the title being played is included in the marked-playback-start-position specifying data, the system controller 60 determines that the marked-playback-start-position specifying data is the marked-playback-start-position specifying data that corresponds to the title being played.

If the marked-playback-start-position specifying data corresponding to the title being played is stored in the RAM 62, the system controller 60 displays the marked-playback-start-position selection-menu screen (step ST110).

FIG. 9 shows an example of the marked-playback-start-position selection-menu screen. For example, when the user marks nine playback start positions (playback start positions A to I), the screen of the display device 47 is divided into nine regions, and divided images corresponding to the marked playback start positions are displayed as nine choices in the respective display regions. Alternatively, the playback time when the playback start position is marked may be superimposed on the image corresponding to the playback start position.

Returning to FIG. 8, when the marked-playback-start-position selection-menu screen is displayed, the system controller 60 determines whether the user has pressed the cursor keys of the operation unit 58 to position the cursor on any of the images displayed on the marked-playback-start-position selection-menu screen, and selected the playback start position by pressing the setting key (step ST111). If the cursor is positioned on any of the images displayed on the marked-playback-start-position selection-menu screen, the selected image is highlighted. Referring to FIG. 10, a frame of the selected image may be thickened, so that the selected image is discriminated from other images. Alternatively, the color of the frame of the selected image may be changed, thus highlighting the selected image.

When the playback start position is selected, the system controller 60 starts the playback from the selected playback start position (step ST112) by outputting various servo commands to the servo controller 18 and the image formation instruction to the video processor 44. The process from step ST105, in which it is determined whether the playback start position is marked, and onward is then repeated.

If the marked-playback-start-position specifying data corresponding to the title being played is not stored in the RAM 62 (if the determination is negative in step ST109), the system controller 60 displays that the playback start position is not marked (step ST113), and the process is terminated.

If the title playback is completed (if the determination is affirmative in step ST107), the system controller 60 determines whether the display of the marked playback start position selection menu is instructed (step ST114).

If the display of the marked playback start position selection menu is instructed after the completion of the title playback, the system controller 60 determines whether the marked-playback-start-position specifying data corresponding to the title recently played is stored in the RAM 62 (step ST109). If the marked-playback-start-position specifying data corresponding to the title recently played is stored in the RAM 62, the process from step ST110, in which the marked-playback-start-position selection-menu screen is displayed, and onward is repeated.

If the display of the marked playback start position selection menu is not instructed after the completion of the title playback (if the determination is negative in step ST114), the process is terminated.

As described above, the DVD player 100 creates the marked-playback-start-position specifying data for specifying the marked playback start position every time the playback start position is marked during the title playback. When the marked-playback-start-position selection-menu screen is displayed in accordance with an instruction from the user, the images corresponding to the marked playback start positions are displayed based on the created marked-playback-start-position specifying data. Since the images corresponding to the marked playback start positions are displayed on the marked-playback-start-position selection-menu screen, the user can confirm which image is to be played by selecting the corresponding playback start position. Thus, the user can appropriately select a desired playback start position from the marked playback start positions.

The present invention is not limited to the above embodiment, and various modifications can be made within the scope of the present invention. For example, in the above embodiment, the video packs which are included in the VOBU being read when the playback start position is marked are read from the DVD 10 every time the marked-playback-start-position selection-menu screen is displayed. Instead, it is possible to read I-picture data in the GOP formed by the video packs in the VOBU. By using the I-picture data, decoding is accomplished without using P-picture and B-picture data. Hence, the processing speed in displaying the marked-playback-start-position selection-menu screen is increased.

Alternatively, the marked-playback-start-position specifying data may include the video packs included in the VOBU being read when the playback start position is marked. The video packs are sent from the stream separator 30 to the system controller 60 in accordance with an instruction from the system controller 60, thus forming the marked-playback-start-position specifying data. When the marked-playback-start-position selection-menu screen is displayed, the video packs are sent from the system controller 60 to the video decoder 36 to be decoded. Since the video packs, which are included in the VOBU being read when the playback start position is marked, are included in the marked-playback-start-position specifying data, it is not necessary to read the video packs from the DVD 10 when the marked-playback-start-position selection-menu screen is displayed. Hence, the processing speed in displaying the marked-playback-start-position selection-menu screen is increased. Instead of the video packs included in the VOBU being read when the playback start position is marked, image data corresponding to the I-pictures in the GOP formed by the video packs in the VOBU may be exclusively included, thus reducing the capacity of data stored in the RAM 62.

It is not particularly specified in the above embodiment how to handle the marked-playback-start-position specifying data stored in the RAM 62 when the DVD 10 is replaced or when the power supply is cut. Even when another title is selected or the DVD 10 is replaced, the marked-playback-start-position specifying data may be maintained in the RAM 62.

For example, it is assumed that the marked-playback-start-position specifying data is maintained when the power supply is cut. In this case, after the power supply is switched on again and the title is selected, the user gives an instruction to display the marked-playback-start-position selection-menu screen. The system controller 60 compares the DVD_ID of the DVD 10 inserted into the DVD player 100 at that time and the VTS number of the VTS corresponding to the selected title with the DVD_ID and the VTS number included in the marked-playback-start-position specifying data maintained in the RAM 62. Based on the DVD_ID of the DVD 10 inserted into the DVD player 100 and the marked-playback-start-position specifying data including the VTS number of the VTS corresponding to the selected title, the system controller 60 displays the marked-playback-start-position selection-menu screen. Since the marked-playback-start-position specifying data is maintained, if the same title is to be read, it is possible to display the marked-playback-start-position selection-menu screen even when the playback start position is not marked by the user. Thus, the user can start to play the DVD 10 from the desired playback start position.

When another title is selected, when the DVD 10 is replaced, or when the power supply is cut, the marked-playback-start-position specifying data can be constructed differently in accordance with how the marked-playback-start-position specifying data stored in the RAM 62 is handled. For example, if deletion of the marked-playback-start-position specifying data is allowed when another title is selected, the marked-playback-start-position specifying data is required to include only the playback time when the playback start position is marked. If deletion of the marked-playback-start-position specifying data is allowed when the DVD 10 is replaced or when the power supply is cut, the marked-playback-start-position specifying data is required to include only the VTS number of the VTS corresponding to the title being played and the playback time when the playback start position is marked.

In the above embodiment, the marked-playback-start-position specifying data include the DVD_ID for specifying the DVD. Instead of the DVD_ID, the number of chapters may be included in the marked-playback-start-position specifying data. The number of chapters in the DVD is obtained by adding the "number of chapters in the VTS" included in each VTSI. Since the number of chapters in the DVD is different for each DVD, the DVD can be specified by the number of chapters in the DVD.

Alternatively, the user may delete the marked-playback-start-position specifying data stored in the RAM 62. When the user thinks that the marked playback start position is necessary but then changes his/her mind afterwards, the user may delete the corresponding marked-playback-start-position specifying data. Therefore, an image corresponding to the unnecessary playback start position is prevented from remaining as a choice on the marked-playback-start-position selection-menu screen.

The marked-playback-start-position selection-menu screen is not necessarily displayed on one screen, but may be displayed on a plurality of screens.

Although the present invention has been described in the context of a DVD player, the present invention is equally applicable to other types of disk players for playing other types of disks, such as a video CD.

The present invention can be applied to a disk player in which the user himself/herself writes playback data (such as a television program) on a disk storage medium. For example, the marked-playback-start-position specifying data is stored in the remaining region of the disk storage medium. Accordingly, images corresponding to the marked playback start positions can be displayed on the marked-playback-start-position selection-menu screen.

A DVD player according to a second embodiment of the present invention is described with reference to the accompanying drawings. The contents of data stored in the DVD and the overall structure of the DVD player of the second embodiment are the same as those of the first embodiment.

Referring to FIG. 6, the differences between the first embodiment and the second embodiment are described.

The operation unit 58 includes various operation keys such as the play key for playing the title; a stop key for stopping the title playback; a pause key for pausing the title playback; a stop position recording key for recording the position at which the playback is stopped; a stop position menu screen display key for displaying a stop position menu screen described hereinafter; the right, left, up, and down cursor keys; and the setting key for confirming an item at the cursor position on the display screen. Signals in accordance with key operations are output to the system controller 60.

The system controller 60 performs control of all functional blocks, such as outputting various servo commands to the servo controller 18 and outputting the image formation instruction in accordance with the operation instruction given by the user to the video processor 44. Specifically, the system controller 60 receives the VMGI and the VTSI included in the data output from the digital signal processor 24 and the NV_PCK output from the stream separator 30 and executes the navigation commands included in these data. Thus, the system controller 60 performs various control operations required for playing the DVD 10, such as outputting various servo commands to the servo controller 18 and outputting the image formation instruction to the video processor 44 in accordance with the operation instruction given by the user. The system controller 60 uses the RAM 62 as a storage region for storing the navigation parameters (SPRM and GPRM), and sets or updates the SPRM and the GPRM in accordance with the navigation command execution, thus using the SPRM and the GPRM as variables when executing the navigation commands thereafter.

When the user presses, during title playback, the stop position recording key of the operation unit 58 to record the position where the playback is stopped (hereinafter referred to as a "stop position"), and the user presses the stop key or the pause key to stop or pause the playback, the system controller 60 creates stop position specifying data for specifying the stop position and stores the data in the RAM 62. Since the RAM 62 is a non-volatile memory, the stop position specifying data is maintained in the RAM 62 even when the DVD player 100 is turned off.

FIG. 11 shows an example of the stop position specifying data. Referring to FIG. 11, the stop position specifying data include a creation date of the data, a disk name of the DVD 10 in the DVD player 100, a VTS number of the VTS corresponding to the title being played when the playback is stopped, a PTT number corresponding to the chapter being read when the playback is stopped, and a playback time (stop position time) from the start of the title playback to the stop position. The creation date of the data is set based on a built-in clock (not shown) included in the DVD player 100. As the disk name for identifying the DVD 10, the disk name included in the VMGI is set. As the VTS number of the VTS corresponding to the title being played when the playback is stopped, the corresponding one is selected from the VTS numbers included in the VMGI. As the PTT number corresponding to the chapter being read when the playback is stopped, the corresponding one is selected from the PTT numbers in the VTSI. The stop position time is used to specify the playback location when the playback is stopped. The stop position time is the sum of the playback time from the start of the title playback to the start of reading the corresponding VOBU, which is included in the PCI and the DSI in the NV_PCK in the VOBU being read until the playback is stopped, and a time from the start of reading the VOBU until the playback is stopped.

When the user presses the stop position menu screen display key of the operation unit 58, the system controller 60 reads all stop position specifying data from the RAM 62 and performs respective control to display the stop position menu screen as a selection menu including various information (stop-position-related information) associated with each stop position.

When the user operates the cursor keys of the operation unit 58 to position the cursor on any of the stop-position-related information displayed on the stop position menu screen, and confirms the selected state of the stop-position-related information by pressing the setting key, the system controller 60 determines whether the DVD 10 corresponding to the selected stop position is inserted into the DVD player 100. If the DVD 10 corresponding to the selected stop position is inserted into the DVD player 100, the system controller 60 starts to play images and sound from the selected stop position by, for example, outputting the servo commands to the servo controller 18 and outputting the image formation instruction to the video processor 44 based on the corresponding stop position specifying data.

Figure 12:
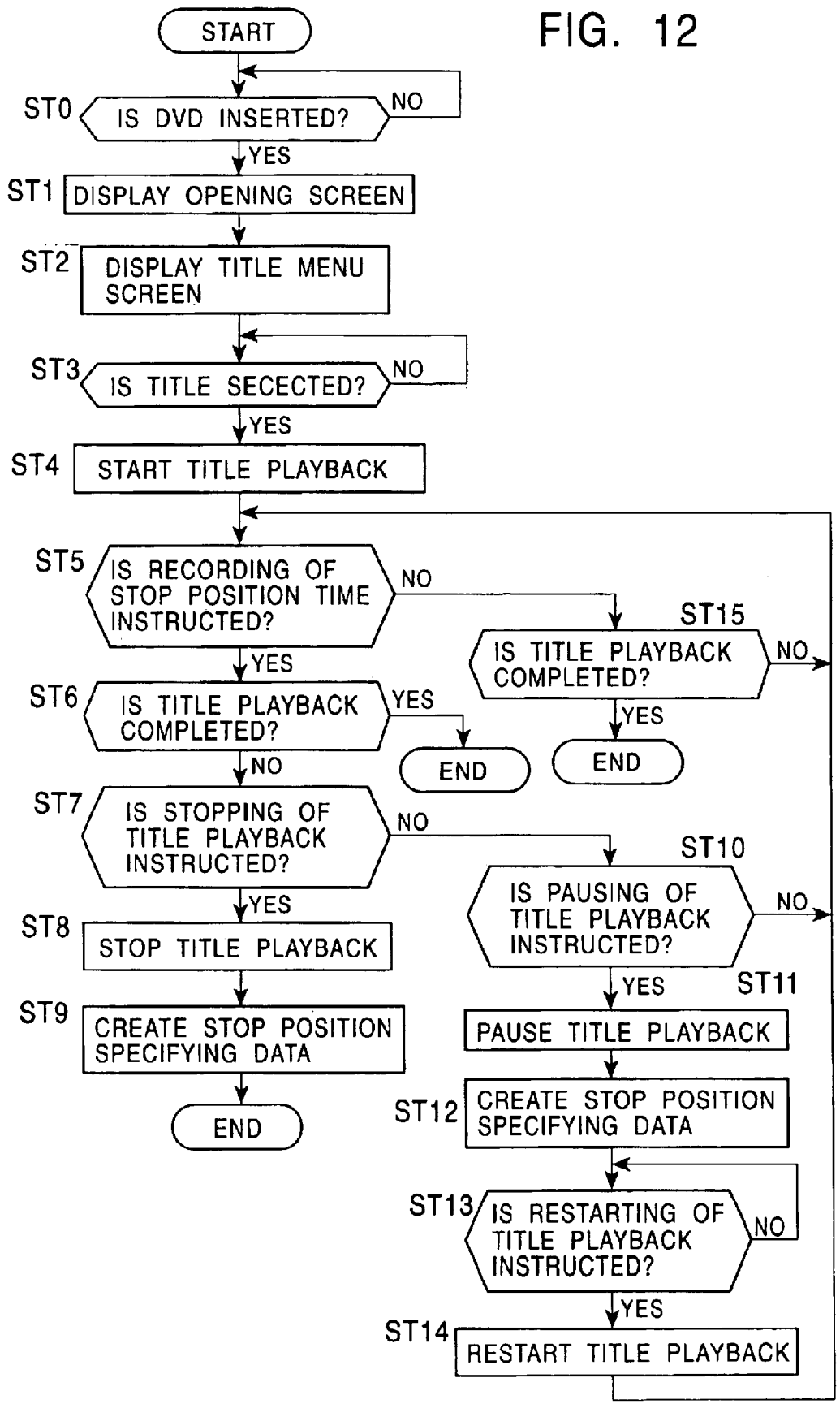
FIG. 12 is a flowchart describing a process of creating the stop position specifying data using the DVD player according to the second embodiment of the present invention.

The operation of the DVD player 100 is described below. FIG. 12 is a flowchart describing a process of creating the stop position specifying data by the DVD player 100. When the power is supplied to the DVD player 100, the system controller 60 determines whether the DVD 10 is inserted into the DVD player 100 by the user (step ST0). If the DVD 10 is inserted into the DVD player 100, the system controller 60 displays an opening screen for a predetermined period of time (step ST1), and displays a title menu screen (step ST2). For example, the system controller 60 reads the VOB corresponding to the opening screen based on the PGCI included in the VMG, and displays the predetermined opening screen. The system controller 60 then specifies the playback position of the title menu displayed after the opening screen, and displays the title menu.

In step ST3, the system controller 60 determines whether a title is selected. If the user operates the cursor keys of the operation unit 58 to position the cursor on a title displayed on the title menu, and confirms the selected title by pressing the setting key, the system controller 60 starts to play the title (step ST4).

When the title playback begins, the system controller 60 determines whether recording of the stop position is instructed (step ST5). If the user presses the stop position recording key of the operation unit 58 to instruct the recording of the stop position, the system controller 60 determines whether the title playback is completed (step ST6). If the title playback is completed, the process is terminated.

If the title playback is not completed, the system controller 60 determines whether stopping of the title playback is instructed within a predetermined period of time since the recording of the stop position is instructed (step ST7). If the user presses the stop key of the operation unit 58 within the predetermined period of time since the recording of the stop position is instructed, and thus the stopping of the title playback is instructed, the system controller 60 stops the title playback (step ST8). The system controller 60 then creates the stop position specifying data corresponding to the stop position and stores the data in the RAM 62 (step ST9).

If the stopping of the title playback is not instructed within the predetermined period of time since the recording of the stop position is instructed (if the determination is negative in step ST7), the system controller 60 determines whether pausing of the title playback is instructed within the predetermined period of time since the recording of the stop position is instructed (step ST10).

If the user presses the pause key of the operation unit 58 within the predetermined period of time since the recording of the stop position is instructed and thus the pausing of the title playback is instructed, the system controller 60 pauses the title playback (step ST11). The system controller 60 creates the stop position specifying data corresponding to the stop position and stores the data in the RAM 62 (step ST12).

In step ST13, the system controller 60 determines whether the user presses the play key of the operation unit 58 to restart the title playback. If the restarting of the title playback is instructed, the system controller 60 restarts the title playback (step ST14). The process from step ST5, in which it is determined whether the recording of the stop position is instructed, and onward is then repeated.

If the pausing of the title playback is not instructed within the predetermined period of time since the recording of the stop position is instructed (if the determination is negative in step ST10), the process from step ST5, in which it is determined whether the recording of the stop position is instructed, and onward is repeated.

If the recording of the stop position is not instructed (if the determination is negative in step ST5), the system controller 60 determines whether the title playback is completed (step ST15). If the title playback is completed, the process is terminated. If the title playback is not completed, the process from step ST5, in which it is determined whether the recording of the stop position is instructed, and onward is repeated. Accordingly, the stop position specifying data is created and stored in the RAM 62.

Figure 13:
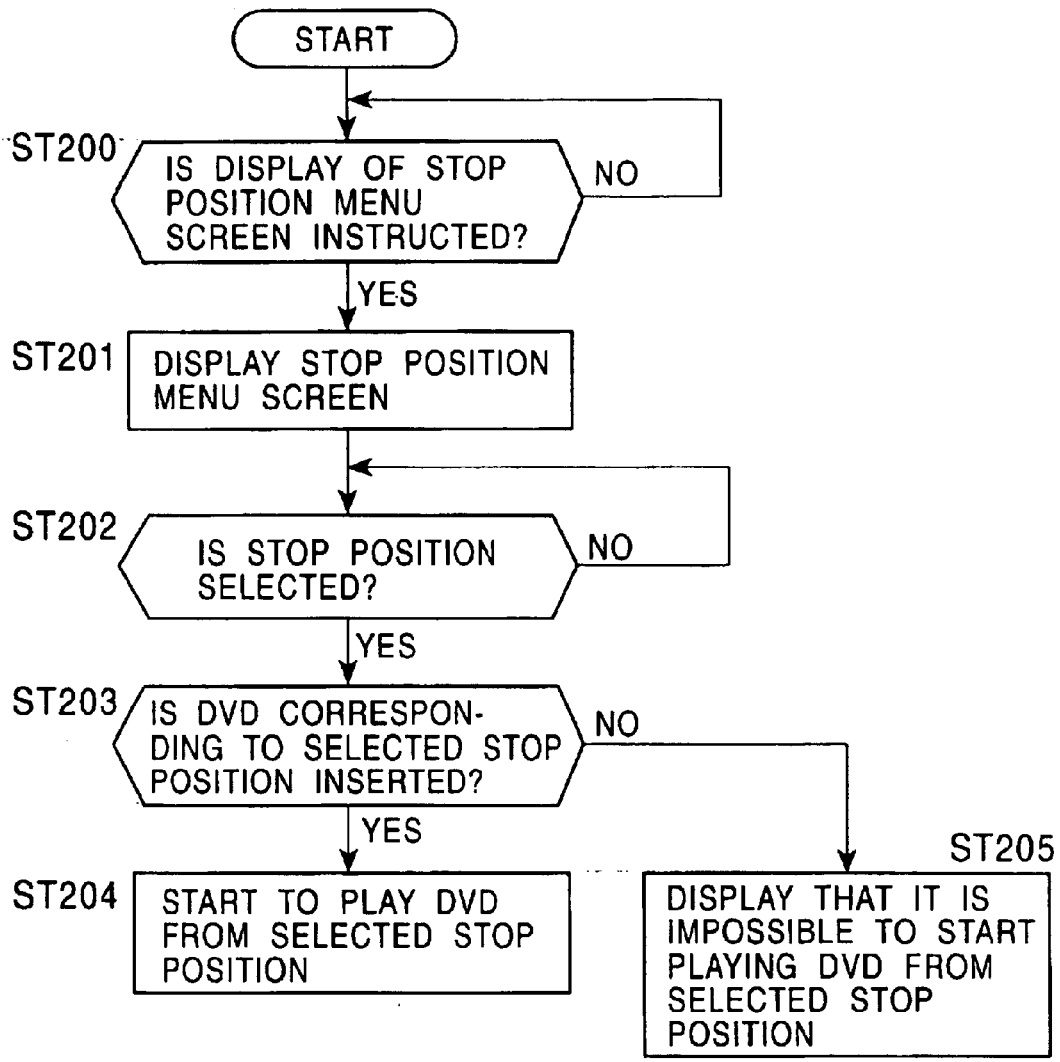
FIG. 13 is a flowchart describing a process of displaying the stop position specifying data and a process of playing back from a stop position using the DVD player.

FIG. 13 shows a flowchart of a process of displaying the stop position menu screen and a process of playing from the stop position. In step ST200, the system controller 60 determines whether the user has pressed the stop position menu screen display key of the operation unit 58 and thus display of the stop position menu screen is instructed. The determination is performed in parallel with normal image and sound playback operation.

If the display of the stop position menu screen is instructed, the system controller 60 reads all the stop position specifying data from the RAM 62, and displays the stop position menu screen (step ST201). Specifically, the system controller 60 reads all the stop position specifying data from the RAM 62, and outputs an instruction to the video processor 44 for displaying the creation date, the disk name, the VTS number (title number), the PTT number (chapter number), and the stop position time of each data.

Simultaneously, the system controller 60 determines whether the DVD 10 is inserted into the DVD player 100. If the DVD 10 is inserted into the DVD player 100, the system controller 60 analyzes the disk name in the VMGI read from the DVD 10, and determines whether the disk name is included in any of the stop position specifying data, that is, whether there is any stop position that corresponds to the inserted DVD 10. If a stop position corresponding to the DVD 10 is present, the system controller 60 outputs an instruction to the video processor 44 to highlight the corresponding display on the stop position menu screen.

If a comment (such as the name of a person who has given the stop instruction) concerning the stop position is created by the user, the system controller 60 outputs an instruction to display the comment in addition to the data contained in each stop position specifying data. The comment is created by selecting characters from an alphabet by operating the cursor keys and the setting key of the operation unit 58, and is stored in the RAM 62. It is not necessary to create the comment when the stop position specifying data is created. Alternatively, the comment can be added afterwards.

The video processor 44 creates image data of the stop position menu screen based on the instruction from the system controller 60, and outputs the image data to the video encoder 46. The video encoder 46 converts the image data output from the video processor 44 into display image signals. These display image signals are output to the display device 47, thus displaying the stop position menu screen.

FIG. 14 shows an example of the stop position menu screen. As shown in FIG. 14, the stop position menu screen displays stop-position-related information, including each item in the stop position specifying data and the comment corresponding to each item, in order from the latest recorded date. The stop-position-related information including the disk name of the inserted DVD 10 is highlighted by using a different color or specific bordering. This enables the user to recognize the stop position that corresponds to the inserted DVD 10. Specifically, the user can distinguish the stop position from which the DVD 10 can be immediately played without replacing the DVD 10. Although the example shown in FIG. 14 displays the stop-position-related information in sequence of recorded date of data (creation date of the stop position specifying data), the stop-position-related information can be listed in a different order, such as in order of disk name.

When the stop position menu screen is displayed, the system controller 60 determines whether the user has operated the cursor keys of the operation unit 58 to position the cursor on any of the stop-position-related information on the stop position menu screen, and confirmed the selected stop position by pressing the setting key (step ST202 in FIG. 13).

If a stop position is selected, the system controller 60 determines whether the DVD 10 corresponding to the selected stop position is inserted into the DVD player 100 (step ST203). If the DVD 10 that corresponds to the selected stop position is inserted into the DVD player 100, the system controller 60 starts to play the DVD 10 from the selected stop position by, for example, outputting the servo commands to the servo controller 18 and outputting the image formation instruction to the video processor 44 (step ST204).

If the DVD 10 that corresponds to the selected stop position is not inserted into the DVD player 100, the system controller 60 displays that it is impossible to start playing the DVD 10 from the selected stop position (step ST205).

As described above, the DVD player 100 creates the stop position specifying data for specifying the stop position and stores the data in the RAM 62 when the title playback is stopped or paused. Based on the stop position specifying data, the stop position menu screen including the stop-position-related information is displayed. If any of the displayed stop-position-related information is selected, the playback is restarted from the corresponding stop position based on the stop position specifying data. Since the stop position menu screen displays various types of information concerning the stop positions, the user can select the appropriate stop position. Since the playback can be restarted from the stop position based on the corresponding stop position specifying data, the user can easily restart the playback from the desired stop position. Since the stop position specifying data is stored in the RAM 62, the playback can be restarted not only from a position at which the playback was recently stopped or paused, but also from a position at which the playback was stopped or paused a long time ago.

Even if the power supply is cut, the DVD player 100 can restart the playback from the stop position after the power is re-supplied since the RAM 62 stores the stop position specifying data.

The present invention is not limited to the above embodiments, and various modifications can be made within the scope of the present invention. For example, in the above embodiment, the playback from the corresponding stop position is restarted when the stop-position-related information displayed on the stop position menu screen is selected. Alternatively, if the stop position corresponds to the latest stop-position-related information, and if the DVD 10 corresponding to the stop position is inserted into the DVD player 100, the playback can be simply restarted by the user using the operation unit 58 without displaying the stop position menu screen.

In the above embodiment, the stop position specifying data is created when the title playback is stopped or paused. Alternatively, the stop position specifying data can be created only when the title playback is stopped, or only when the title playback is paused.

In the above embodiment, the stop position specifying data is created only when the recording of the stop position is instructed. Alternatively, the stop position specifying data can be always created when the playback is stopped or paused. It is possible to enable the user to delete the stop position specifying data stored in the RAM 62. Deletion of the stop position specifying data prevents the stop-position-related information corresponding to unnecessary stop positions from being displayed on the stop position menu screen. The stop position menu screen is not necessarily displayed on one screen. If there are numerous pieces of stop-position-related information, the stop position menu screen can be divided into a plurality of screens.

Although the present invention has been described in the context of a DVD player, it is applicable to other types of disk players, such as CD players and video CD players.

What is claimed is:

1. A disk player for marking playback locations when images and/or sound stored in a disk storage medium are being played and for subsequently playing the images and/or the sound from the marked playback locations as playback start positions, said disk player comprising:

specification data creation/storage means for creating and storing playback location specifying data for specifying the playback locations marked during playback;

selection menu display means for displaying a selection menu including a plurality of choices associated with playback images corresponding to the playback locations based on the playback location specifying data stored by the specification data creation/storage means, wherein the playback images are created by reading data stored in the disk storage medium when the selection menu is displayed, generating I-picture, P-picture, and B-picture data based on the data read from the disk storage medium, and selecting a type of video data corresponding to the marked playback location for display; and data playing means for playing, when any of the choices included in the selection menu is selected, the images and/or the sound from the associated playback location as the playback start position.

2. A disk player according to claim 1, wherein each of the playback location specifying data includes information for identifying the disk storage medium to be played.

3. A disk player according to claim 1, wherein each of the playback location specifying data includes a video title set number of a video title set corresponding to a title being played.

4. A disk player according to claim 1, wherein each of the playback location specifying data includes information about a playback time from the start of title playback to the marked playback start position.

5. A disk player according to claim 2, wherein the information for identifying the disk storage medium includes a disk name included in video manager information.

6. A disk player according to claim 2, wherein the selection menu display means creates, when displaying the selection menu, the playback images associated with the choices by reading data stored in the disk storage medium.

7. A disk player according to claim 4, wherein the playback time is the sum of a playback time, which is included in a navigation pack in a video object unit being read when the playback start position is marked, from the start of the title playback to the start of reading the corresponding video object unit and a time from the start of reading the video object unit to the marked playback start position.

8. A disk playing method for marking playback locations when images and/or sound stored in a disk storage medium are played and for subsequently playing the images and/or the sound from the marked playback locations as playback start positions, said disk playing method comprising the steps of:

creating and storing, when the playback locations are marked, marked playback start position specifying data corresponding to the marked playback start positions; and displaying, when display of a marked-playback-start-position selection menu screen is instructed, a plurality of images corresponding to the marked playback start positions on one screen, wherein the images are created by reading data stored in the disk storage medium when the selection menu screen is displayed, generating I-picture, P-picture, and B-picture data based on the data read from the disk storage medium, and selecting a type of video data corresponding to the marked playback location for display.

9. A disk playing method according to claim 8, wherein, when any of the images displayed on the marked-playback-start-position selection-menu screen is selected, playback begins from the selected playback start position based on the marked-playback-start-position specifying data.

10. A disk playing method according to claim 8, wherein, when the marked-playback-start-position selection-menu screen is displayed, the images are displayed by reading video packs included in video object units being read when the playback start positions are marked.

* * * * *